Nov. 3, 1942.                C. S. ASH                2,300,532
                        DUAL WHEEL ASSEMBLY
               Filed Nov. 15, 1940        6 Sheets-Sheet 1

INVENTOR
C. S. Ash
BY
Morgan Finnegan & Durham
ATTORNEYS

Nov. 3, 1942.  C. S. ASH  2,300,532
DUAL WHEEL ASSEMBLY
Filed Nov. 15, 1940  6 Sheets-Sheet 2
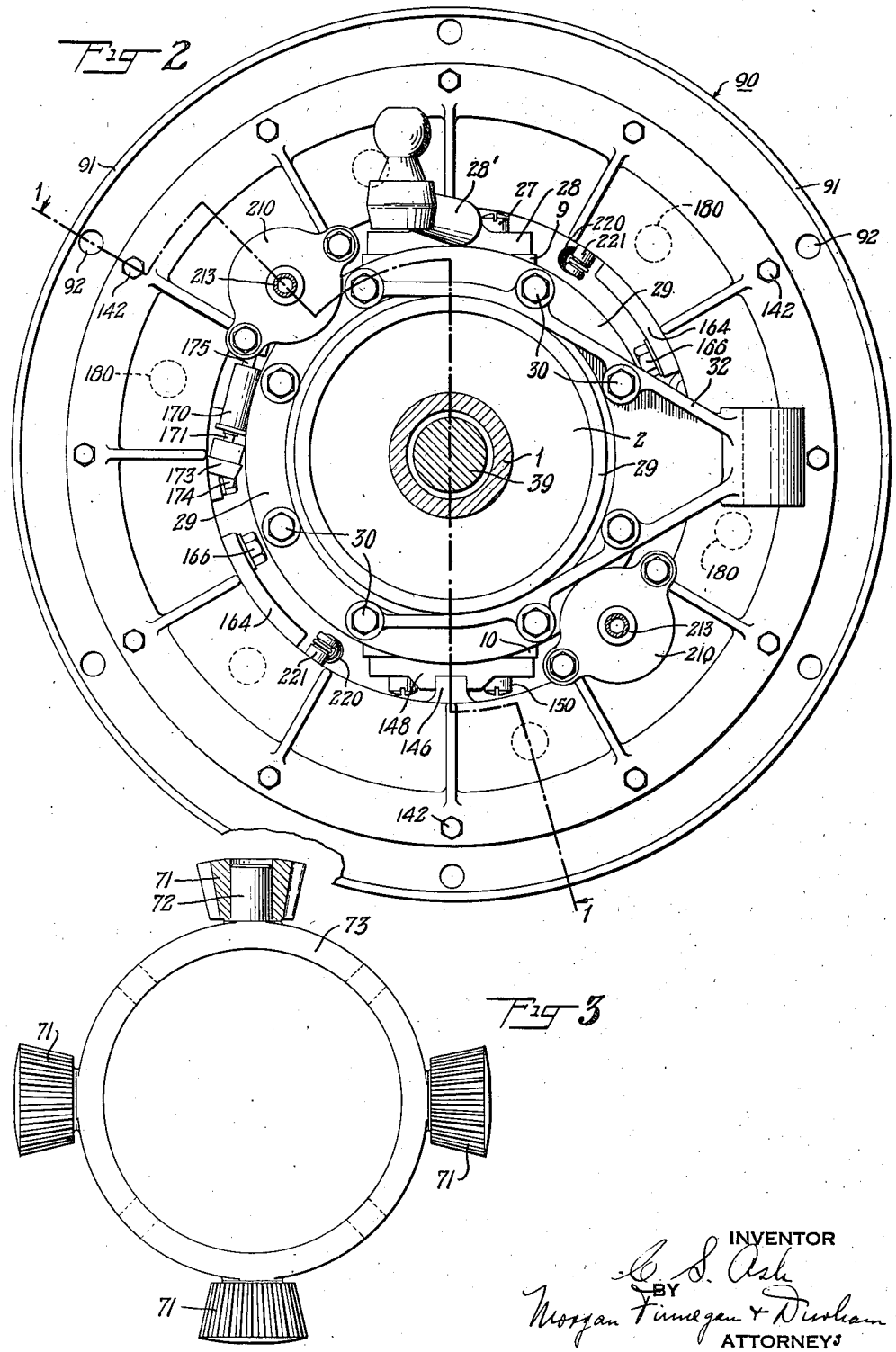

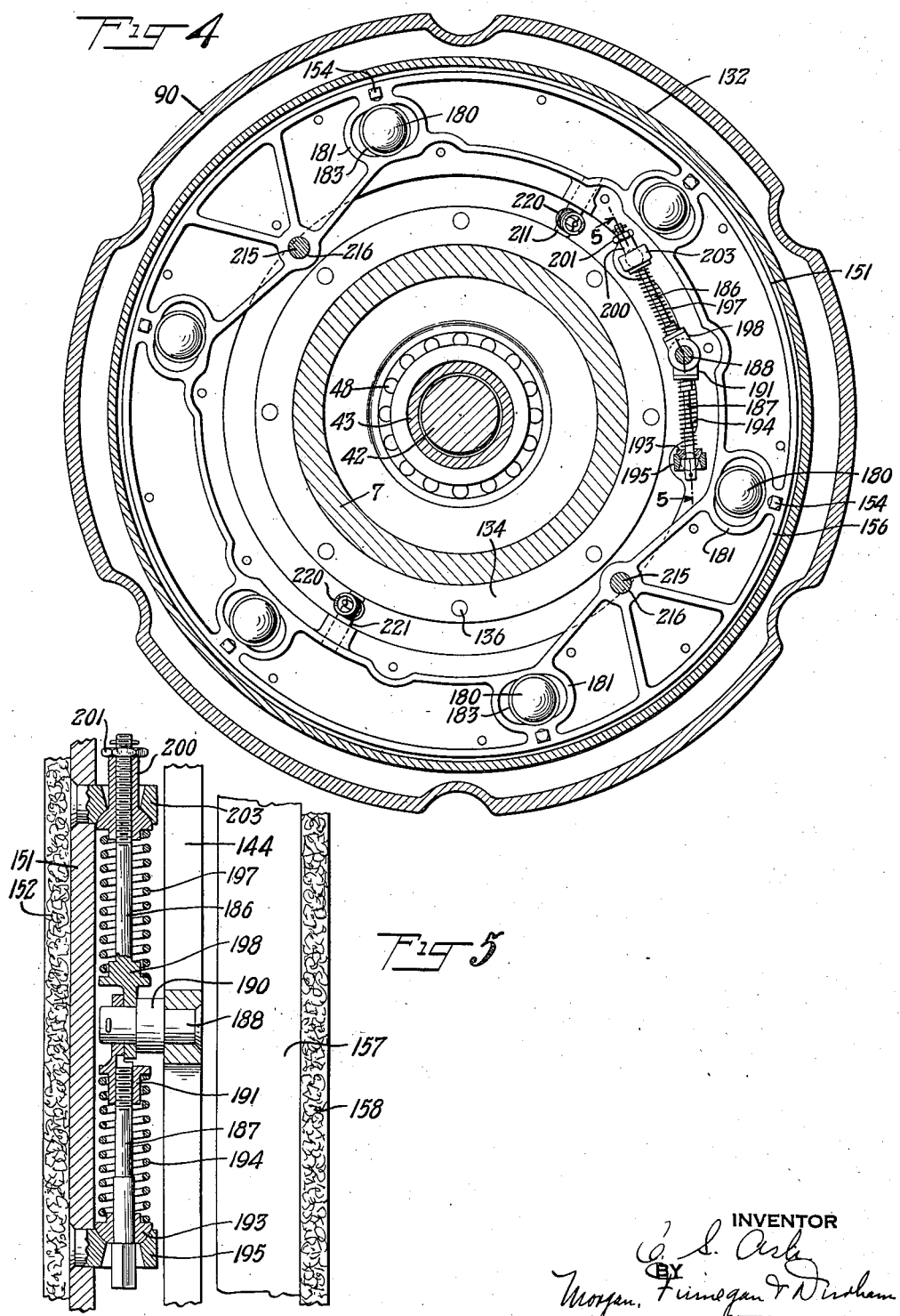

Nov. 3, 1942.   C. S. ASH   2,300,532
DUAL WHEEL ASSEMBLY
Filed Nov. 15, 1940   6 Sheets-Sheet 4

INVENTOR
C. S. Ash
BY
Morgan, Finnegan & Durham
ATTORNEYS

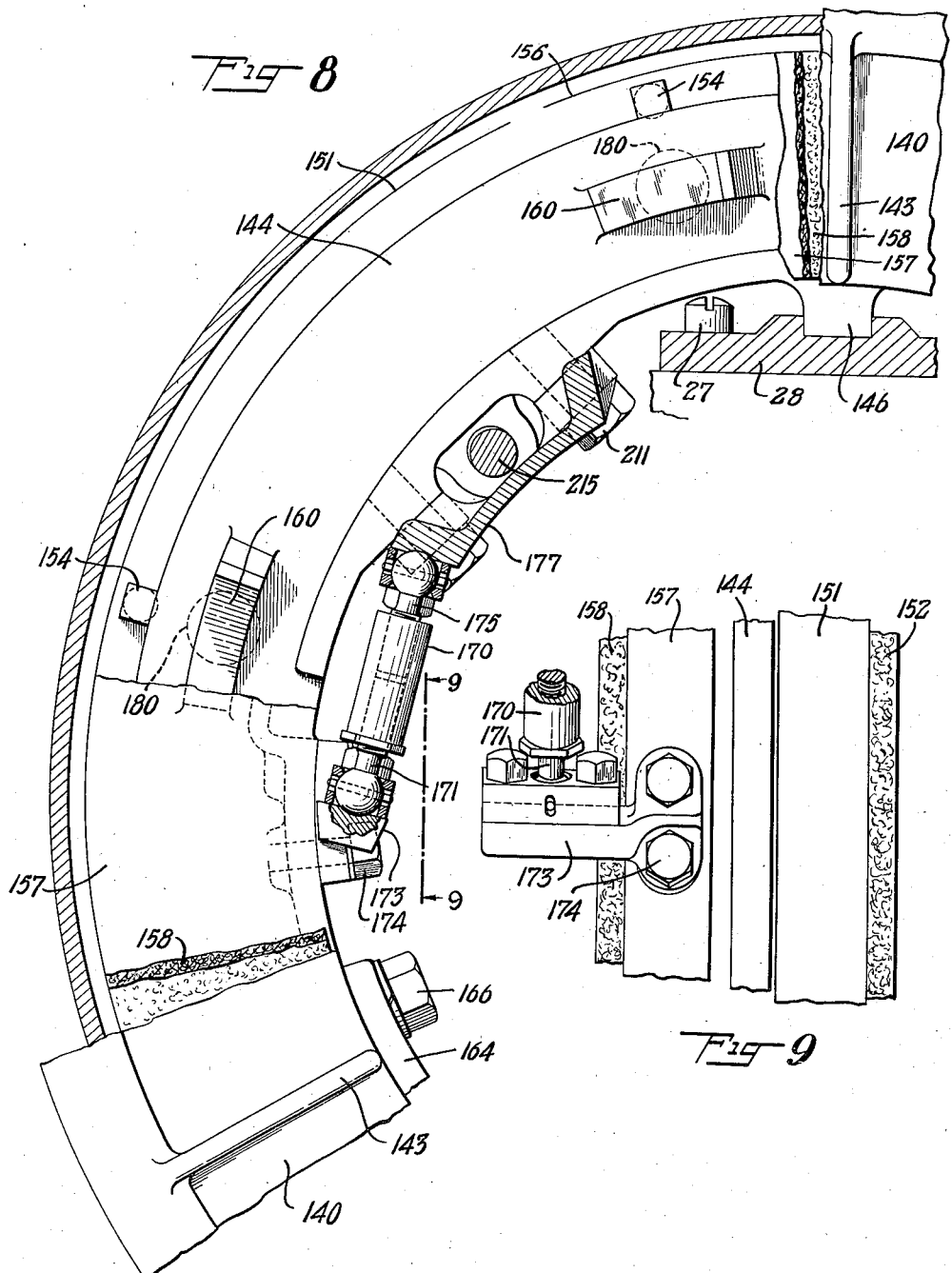

Nov. 3, 1942.    C. S. ASH    2,300,532
DUAL WHEEL ASSEMBLY
Filed Nov. 15, 1940    6 Sheets-Sheet 6
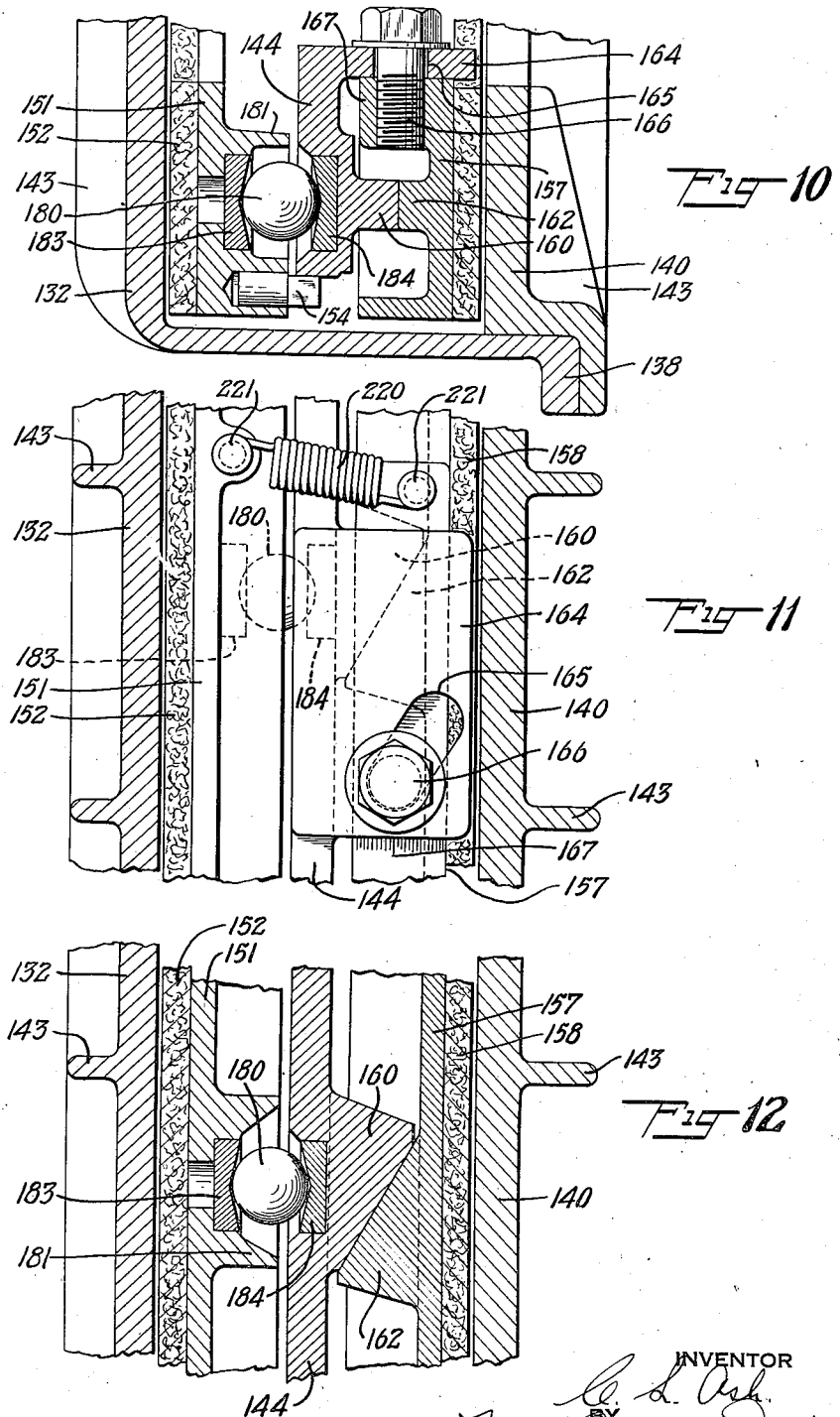

Patented Nov. 3, 1942

2,300,532

UNITED STATES PATENT OFFICE 2,300,532

DUAL WHEEL ASSEMBLY

Charles S. Ash, Milford, Mich.

Application November 15, 1940, Serial No. 365,740

11 Claims. (Cl. 188—18)

The invention relates to new and useful improvements in dual wheel assemblies for vehicles, and more particularly to such improvements in dual, driven, differential, dirigible wheel assemblies especially adapted for service on heavy motor vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is a side elevation of the wheel assembly showing the axle, axle housing and hydraulic brake line in section taken along the line 2—2 of Fig. 1;

Fig. 3 is a side elevation of the pinion carrying ring of the differential between the wheels one pinion being shown in section for greater clarity;

Fig. 4 is a cross section taken along line 4—4 of Fig. 1 viewed toward the hub of the wheel assembly;

Fig. 5 is a fragmentary, enlarged, longitudinal transverse section taken along the line 5—5 of Fig. 4;

Fig. 8 is a fragmentary side elevation of the brake mechanism viewed toward the hub of wheel assembly, certain parts being broken away for the sake of clarity;

Fig. 9 is a fragmentary, detailed, elevation of the brake adjusting means viewed from line 9—9 of Fig. 8;

Fig. 10 is a fragmentary vertical axial section taken along the line 10—10 of Fig. 6 showing the details of the servo mechanism for the brakes;

Fig. 11 is a fragmentary vertical, longitudinal section taken along line 11—11 of Fig. 6 showing further details of the servo mechanism for the brakes; and Fig. 12 is a fragmentary vertical, axial section taken along line 12—12 of Fig. 6.

Figure 1:
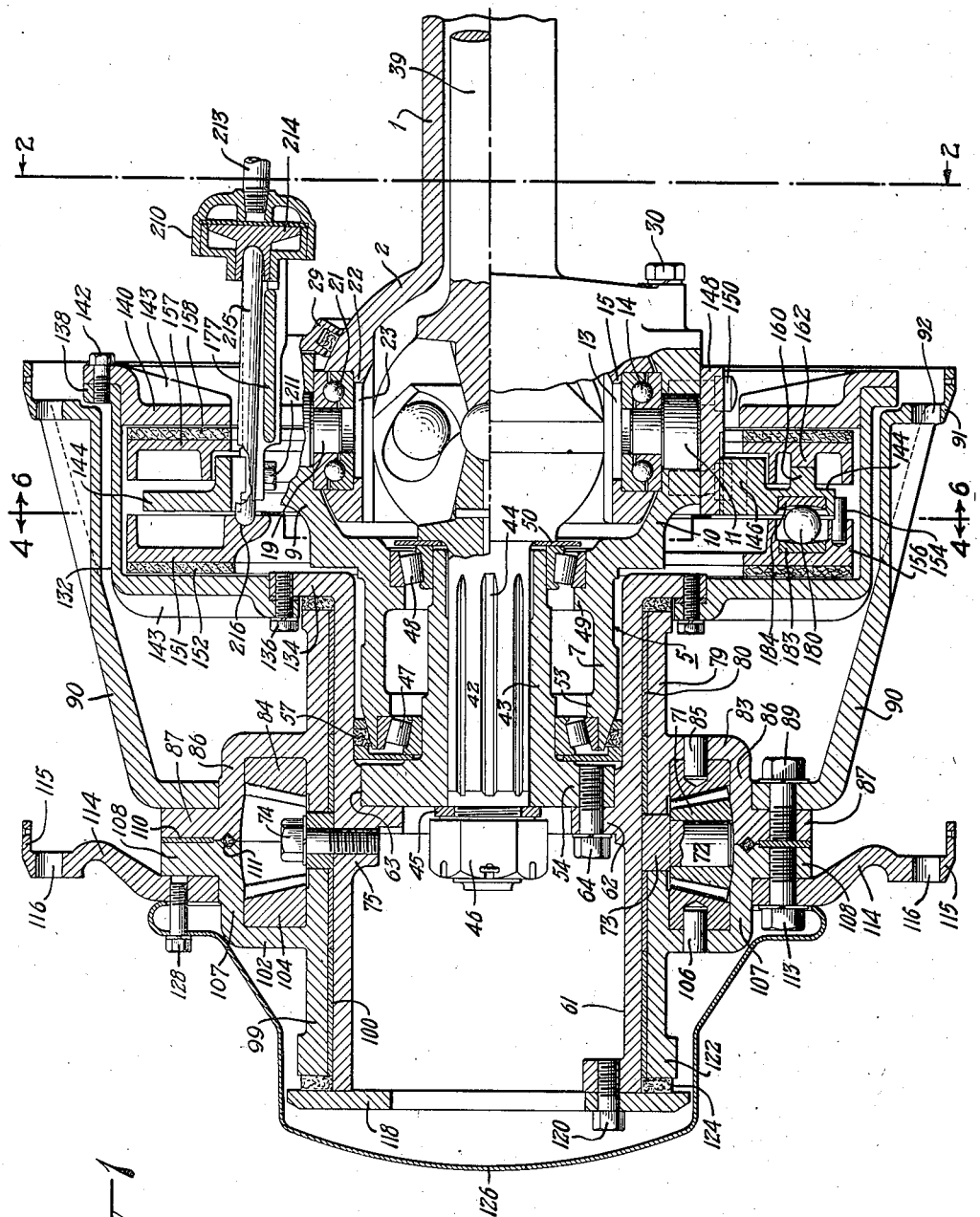
Fig. 1 is a longitudinal transverse section of a wheel assembly embodying the invention, taken along the line 1—1 of Fig. 2.
Figure 6:
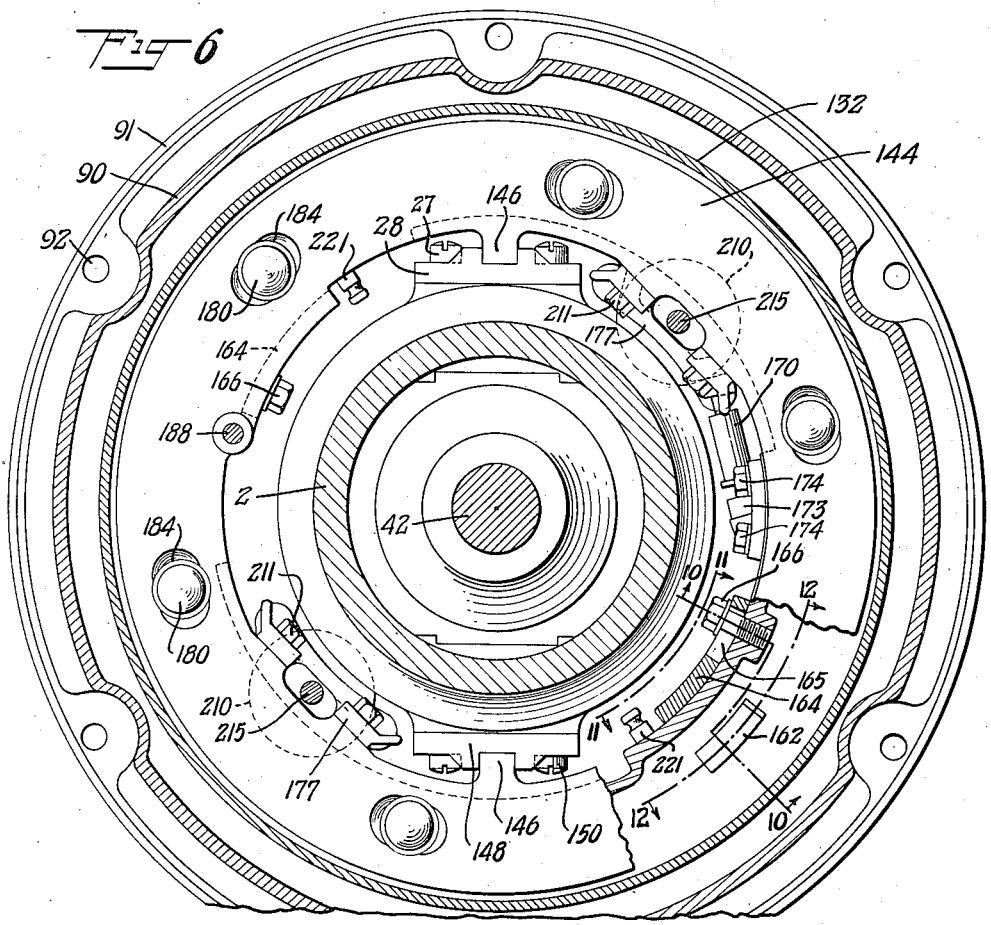
Fig. 6 is a cross section taken along line 6—6 of Fig. 1 viewed inwardly from the hub of the wheel assembly.

Objects of the invention are to provide powerful and equalized driven dual wheel equipment for motor trucks and other heavy-duty vehicles, and more especially to provide such wheel equipment for use at the front end of such vehicles, said equipment being capacitated to effect the steering in addition to the other enumerated functions; to provide at the front end of heavy-duty motor vehicles dual, driven, differential, dirigible wheel equipment; to provide therewith braking means exerting uniform and equalized braking action on all the wheels; to provide servo action for such braking means to cooperate with the braking means in retarding both forward and rearward movement; to provide improved actuating and adjusting means for brakes to be used with dual, driven, differential, dirigible wheels; to provide dual, dirigible front wheels at either end of the front axle beam, both wheels of each pair being positively driven, and at the same time permitting differential movement between the driven wheels of each pair to compensate for differences of path between the inboard and outboard wheels of the pair, or for other cause of variations in peripheral travel or velocity; to provide for absolutely equalized, concurrent braking action upon the wheels of a pair, while freely permitting necessary differential movement of the wheels; to provide simplified and improved bearing means for a pair of dual, driven, differential, dirigible wheels; to provide such bearing means in combination with concurrent, equalized braking equipment for such dual wheeled equipment; to provide dual wheel equipment at each end of the front axle having the above-described properties, and providing uniform steering control and also permitting full differential movement of all said wheels concurrently with a positive drive of all four wheels.

To these ends a front end dual wheel assembly is provided having a front axle-beam housing with a centrally located driven differential enclosed, and at either end of the axle housing there is connected thereto by a usual yoke and knuckle and king pin joint a hollow spindle, upon which a pair of dual wheels is journaled by means of hubs mounted on the spindles, the spindles being movable about the king pins by the steering mechanism in the usual manner, Within said front axle-beam housing are two live shafts, driven from the central differential, each shaft carrying at its outer end a live stub shaft connected thereto by a universal joint. The drive from the live stub shafts to their respective dual wheels comprises a differential gear wherein a planet gear and an arm on which it is mounted are rotatively driven by the stub through the hollow spindle, the planet gear meshing with two gear rings fixed to the two wheels, respectively. The planet gear is rotated with the driven stub shaft and normally both wheels are rotated with the planet gear, but owing to the differential, the wheels each have relative rotational movement with respect to the planet gear without disturbing or impairing the positive drive of the wheels from the driven stub shaft.

Equalized brake pressure may be applied to the planet gear through the hollow spindle to the planet gears to retard the pair of wheels. To this end a brake drum is rigidly attached to the hollow spindle, and mounted within it are internally-expanding brake shoes to have frictional contact with both internal lateral faces of the drum when braking is effected. Means responsive to the will of the vehicle operator are provided for forcing the shoes against their respective braking surfaces of the brake drum with a pressure which is at all times equalized and servo means are located between the shoes to automatically increase the effective braking pressure of the brake drums for any particular pressure applied by the vehicle operator, whether the vehicle is proceeding forward or to the rear. Adjusting means are provided to maintain the brake shoes in a position to exert maximum pressure upon the brake drum.

It will be understood that the foregoing general description and the following detail description as well are exemplary and explanatory of the invention but are not restrictive thereof.

Referring now in detail to the embodiment of the invention illustrated by way of example in the accompanying drawings, a front axle beam is provided comprising a housing 1 formed to include at its central portion a differential drive (not shown) and having at each end a hollow, spherical knuckle 2. Mounted on the knuckle 2 by means of a king pin joint is a non-rotatable spindle 5 having a hollow, cylindrical horizontally-extending body 7 and integral therewith two arms 9 and 10, which may be connected together by spherical side webs, and which extend inwardly and embrace the top and bottom portions of the hollow spherical knuckle 2 of the axle-beam housing 1. The king pin connection between the spindle yoke and the housing, on the bottom side, comprises a shoulder pin 11, mounted and supported in the lower yoke-arm 10 and projecting upwardly therefrom into an opening 13 in the lower part of the spherical knuckle 2. Between the yoke-arm 10 and the knuckle 2 is an anti-friction thrust bearing 14, and one race thereof is supported on the top of the enlarged head of the pin 11, and an annular flange 15 formed in the upper part of the aperture 13 of the knuckle 2 rests upon and is supported by the other raceway of the bearing.

On the upper side of the king pin connection is a similar but reversed construction wherein a pin 19 with an enlarged head is fitted into the yoke arm 9, and the lower face of the head of pin 19 rests on the top ring of an anti-friction thrust bearing 21, which in turn is supported by its lower ring resting on an annular, inwardly-extending projection 22, formed in the opening 23 in the top of the knuckle. Fixed to the yoke-arm 9 by bolts 27 (Fig. 2) is a plate 28 having an arm 28' formed thereon which is connected to the steering mechanism in any known and suitable manner.

A lubricant seal in the form of a spheroidal ring 29 is fixed on the inner side of the yoke construction, and is held in place by bolts 30, said bolts also securing the tie-rod yoke 32 to the spheroidal ring 29 and the yoke constructions 9 and 10. The tie-rod yoke is attached to the tie rod (not shown) to effectuate the steering of the vehicle, all in a known manner.

The embodied form of means for driving all four of the front wheels, as here exemplarily embodied comprises at either side a live shaft 39, driven from the differential which is mounted in the axle housing 1, such a shaft extending from the differential to the dual wheels at either end of the axle shaft. Connected to the live shaft 39 by any suitable universal joint, shown here conventionally as a Marmon-Herrington joint, is a live stub shaft 42. Surrounding this live stub shaft is a hollow driven sleeve 43, the shaft and sleeve being rotatably connected together, but so as to allow for axial movement between them, and for this purpose, the periphery of the shaft is formed into a broad face pinion 44 with which mesh inwardly-projecting teeth formed on the interior of the sleeve 43. That sleeve is held against axial movement by retaining ring 45 facing with nut 46 which is screwed onto the threaded end of shaft 42. The live stub shaft 42 and its connected rotatable sleeve 43 are enclosed within the hollow spindle 7 and are rotatively mounted therewith by means of radial thrust roller bearings 47 and 48 interposed between the exterior of the sleeve 43 and the interior of the hollow spindle 7. The inner bearing 48 is held axially in position between an inwardly-extending annular projection 49 on the interior of the sleeve 7 and a ring 50. The outer bearing is held axially in position between an inwardly-extending annular projection 53 on the interior of sleeve 7 and an outwardly-projecting annular flange 54 formed on the exterior end of the sleeve 43.

The dual wheel structure and the connections thereto from the driving means to effect the required differential drive, in accordance with one feature of the invention, and as here embodied, are mechanically combined with braking means for exerting equalized retardation on the dual wheels through the differential gearing. As embodied, a hub-like cylinder 61 encloses and extends outwardly beyond the hollow spindle 7, and is connected to the live sleeve 43 to rotate therewith, and a lubricant retaining ring 57 is preferably interposed. The braking mechanism is connected to the cylindrical member 61, as hereinafter described. The hub-like cylinder 61, at its central portion, has an integral, inwardly-projecting annular flange 62, which has near its base an inwardly and axially-projecting annular shoulder 63. The inner flat face of flange 62 and the shoulder 63 fit against the outer faces of the outwardly-projecting annular flange 54, and these parts are held together by screw bolts 64.

The differential gear drive comprises a plurality of bevel pinions 71, rotatively mounted on stub shafts 72 which are fixed to and project outwardly radially from a carrying ring 73 (Fig.

3). Ring 73 is attached to the periphery of the hub-like cylinder 61 by screw bolts 74, which extend through the cylinder and into the internally extending strengthening shoulders 75 which are integral with the cylinder. The planet gears 71 are thus connected for rotation with the hub-like cylinder 61, sleeve 43 and stub shaft 42.

The dual wheels have side-by-side hubs journaled on the hub-like cylinder 61, and are gear connected to the opposite sides of the planet gears 71 of the differential drive. As here embodied, the inboard wheel has a hub 79 mounted on the cylinder 61 on the inner side of carrying ring 73, with an interposed anti-friction bushing 80. The hub 79 at its outer end abuts on the inner face of the ring 73, with or without an interposed thrust bearing, and integral with the hub 79 is an outwardly-extending annular flange 83, located a short distance inwardly from the outer end of the hub, to provide a seat for a bevel gear ring 84, which is fixed to flange 83 by a series of spaced apart pins 85, the gear ring 84 being in mesh with the planet pinions 71 on one side thereof. Integral with hub 79 and flange 83 are the axially extending flange 86 having integral with its end the outwardly extending annular flange 87. Fastened to the inner surface of annular flange 87 by suitable means such as screw bolts 89, is the web 90 of the inboard wheel, which web is preferably deeply dished to enclose a braking mechanism, as later described, and also to enclose the king pin mounting, the projected axis of which, preferably, would intercept the road surface between the treads of the dual wheels. Integral with web 90 is the outwardly and axially extending annular ring 91, which is provided with a series of spaced apart bolt receiving holes 92 for the mounting of suitable rims and tires in any known and suitable manner.

The hub 99 of the outboard wheel is journaled on the hub-like cylinder 61 on the outer side of carrying ring 73 with an interposed anti-friction bushing 100. The differential drive mechanism for the outboard wheel is similar to that provided for the inboard wheel, and comprises the outwardly extending annular flange 102 being constructed integral with hub 99, located a short distance outwardly from the inner face of said hub, to provide a seat for a bevel ring gear 104, which is fixed to flange 102 by a series of spaced apart pins 106, the ring gear 104 being in mesh with the planet pinions 71 on one side thereof. Integral with flange 102 is the axially extending flange 107 having integral with its inner end the outwardly extending annular flange 108, said flange abutting against the corresponding flange 87 of the inboard wheel structure and having therebetween the anti-friction bearing 110 and sealing ring 111.

Fastened to the outer flat surface of the annular flange 108, by means of screw bolts 113, is the web 114 of the outboard wheel, having on its periphery the inwardly extending annular ring 115 to receive the outboard rim and tire (not shown) which are attached to the web 114 by means of bolts extending through a series of spaced apart holes 116 provided in the web 114 for that purpose. The annular ring 118 is positioned to abut at its inner face against the outer end of cylinder 61 and is attached thereto by bolts 120, which pass through the ring 118 and are screwed into a series of spaced apart, inner-projecting lugs integral with cylinder 61 at the outer end thereof. The inner face of ring 118 also abuts against an outwardly-extending annular strengthening portion 122 integral with hub 99 at its outer end, thus holding said hub against axial movement with respect to the cylinder 61, and a retaining ring 124 is preferably positioned between ring 118 and hub 99. Cover plate 126 acts as a closure for the outer end of the structure and is secured to the outboard wheel web 114 by bolts 128.

The means for effecting equalized braking action upon the dual wheels, in accordance with one feature of the invention, acts preferably through the differential gear and is provided with servo action to automatically increase the effective braking action regardless of the direction in which the wheels are rotating.

As here embodied these braking means comprise the outwardly and axially extending annular drum portion 132 which is secured at its inner periphery to the outwardly extending annular integral flange portion 134 of cylinder 61 by bolts 136, and integral with said drum portion 132 at is outer periphery is an outwardly extending annular flange 138 to which the annular plate 140 is attached by screw bolts 142 for rotation with the drum portion and the cylinder 61. The drum portion 132 and annular plate 140 are supplied with a plurality of radially extending, integral air circulating fins 143 to facilitate the dissipation of heat from their outer surfaces.

The braking mechanism is located within the area enclosed by drum portion 132 and annular plate 140 and as here exemplarily shown comprises the annular, channeled, brake shoe anchor member 144 having on its inner periphery a pair of inwardly extending integral lugs 146 which are seated in longitudinally extending, recessed seats formed in plates 28 and 148 which are mounted on the yoke members 9 and 10 of the spindle and fixed thereto by screw bolts 27 and 150, anchor ring 144 being thus mounted for sliding axial movement upon plates 28 and 148 but held against rotation about the axis.

The outer annular channeled brake shoe 151 has fixed to its flat, annular outside face the frictional flat annular lining member 152 for frictional contact with the inner flat annular surface of drum portion 132 when braking is effected, and is mounted for angular and axial movement with respect to anchor member 144 by means of a series of spaced apart circular pins 154 fixed in an annular peripheral flange portion 156 integral with its outer periphery, said pins extending inwardly and axially for sliding engagement with the outer periphery of anchor member 144. The inner annular channeled brake shoe 157 has fixed to its outer flat annular surface the flat annular lining member 158 for frictional contact with the flat annular inner face of the plate 140, and is fixedly attached to the anchor member 144 but axially adjustable with respect thereto.

This adjustable attachment, as here exemplarily shown, comprises a plurality of spaced apart wedge shaped projections 160 extending from the inner face of the anchor member 144, and the inclined faces of these projections abut against the oppositely inclined faces of the similarly shaped and placed but oppositely disposed spaced apart projections 162 extending from the outer face of the inner brake shoe 157, as shown in Fig. 12. A plurality of rectangular plates 164 (Fig. 11) integral with the anchor member 144 on the inner periphery thereof extend inwardly from the anchor member and across the inner periphery of the inner brake shoe 157, and are provided with angularly extending slots 165, the longitudinal center line of this slot being parallel to the abutting inclined surfaces of the projections 160, 162. The screw bolt 166 is positioned within slot 165 and is screw threaded into the axially projecting inner peripheral flange 167 integral with the inner brake shoe 157, as shown in Fig. 10.

With the construction shown it will be apparent that the axial distance between the anchor plate 144 and the inner brake shoe 157 may be determined by the angular rotation of brake shoe 157, the wedged shaped oppositely inclined abutting projections 160, 162 serving to increase or decrease the distance depending upon the direction of rotation, and the desired distance may be maintained by tightening the screw bolts 166.

Figure 7:
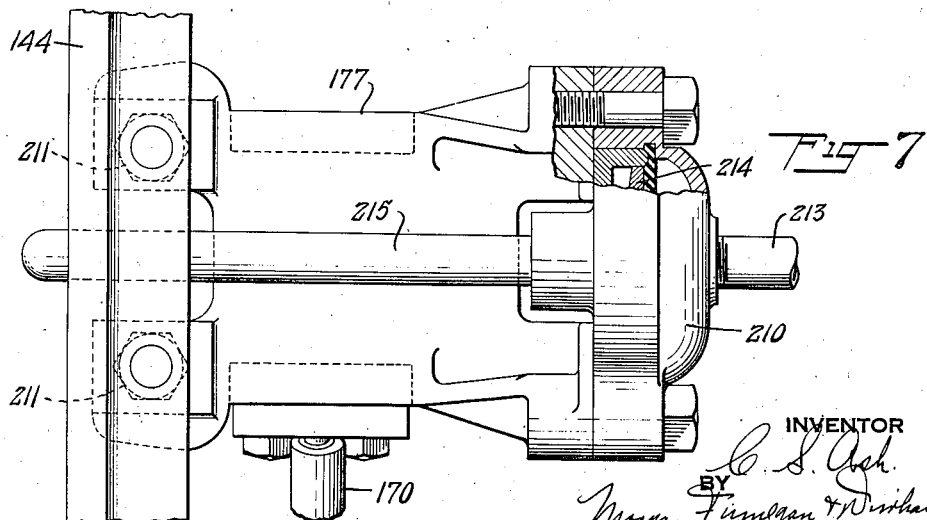
Fig. 7 is a plan view of the hydraulic brake-actuating means, certain parts being broken away for greater detail.

In order to provide an easily accessible and efficient means for effecting the most minute changes in axial distance between the inner brake shoe 157 and anchor member 144, an adjusting mechanism is provided to effect the desired angular rotation of brake shoe 157, and this mechanism comprises the turn buckle 170 (Fig. 8), one of the rods 171 of which is attached by ball and socket connection to the angularly bent bracket 173 which is firmly bolted to the inner periphery of the inner brake shoe 157 by screw bolts 174, as shown in Fig. 9. The other rod 175 of turn buckle 170 is attached by ball and socket connection to the frame 177 of the hydraulic brake actuating mechanism, this frame being bolted to the anchor member 144 as hereinafter more particularly described (Fig. 7).

The servo mechanism for the brakes, according to the present preferred embodiment as here exemplarily shown, comprises a plurality of spherical steel balls 180 positioned between the outer brake shoe 151 and the anchor member 144 which serve to increase the effective braking pressure upon those members as the braking of the vehicle is taking place. As shown in Fig. 4, the web-like strengthening structure 181 is integral with the outer brake shoe 151 on its inner face and comprises as an integral part of its construction a plurality of dished seats 183 to receive the spherical balls 180, the surface of said seats facing the anchor member 144 being arcuately concave. The anchor member 144 on its outer flat annular face has a plurality of similarly shaped and placed but oppositely facing dished seats 184 each of the spherical balls 180 being carried between a pair of the dished seats 183, 184 and normally positioned against the lowest portions of their respective arcuately concave surfaces.

In order to adjustably and resiliently limit the angular movement in either direction of the outer brake shoe 151 upon the anchor member 144 a pair of rods 186, 187 have a common attachment at their adjoining and overlapping bases with the anchor member 144, the pin 188 for this purpose passing through circular holes in the bases of the rods and being firmly fixed to the anchor member, as shown in Fig. 5. The outwardly extending annular flange portion 190 of the pin 188 serves to properly space the rods 186, 187 at their respective bases from the anchor member 144. The rod 187 is externally threaded at its lower extremity and fitted into its internally threaded base portion 191, and carries near its other extremity the integral annular flange 193, a coiled spring 194 being positioned about rod 187 and held for compression between the base portion 191 and the flange 193. The outer spheroidal surface of flange 193 is seated in the annular concave surface of the shoulder member 195, which is firmly attached to the outer brake shoe 151.

The adjusting mechanism for rod 186 may be of a construction similar to that just described for rod 187, or may have the alternative design shown in Fig. 5. As there embodied spring 197 is positioned about rod 186 and held for compression between the outwardly extending annular flange 198 near the base of the rod and the internally threaded cap member 200 which is threaded onto the outer extremity of the rod and locked thereon by lock nut 201. The outer spheroidal annular surface of cap member 200 is seated in the concave annular surface of shoulder member 203 which is firmly attached to the outer brake shoe 151.

With the construction of the servo mechanism shown it will be apparent that when the anchor ring 144 and the outer brake shoe 151 are actuated axially away from each other when the operator's brake is being applied, as hereinafter described, the inner brake shoe 157 will exert braking action upon the plate 140 through its lining member 158, and the outer brake shoe 151 will move toward and frictionally engage the drum 132 through its lining member 152. Upon frictional engagement the outer brake shoe will tend to rotate with the brake drum 132 and may do so to an extent against the compression of spring 194 or 197 depending upon the direction of rotation.

As the outer brake shoe rotates each of the spherical balls 180 will engage the ascending arcuate surfaces of a set of the seats 183, 184, and an increased braking pressure will be exerted upon the outer shoe 151 and the anchor ring 144 which will be transmitted to the drum 132 and the plate 140 respectively. By adjusting the length of the rods 186, 187 by the means shown the amount of rotation permitted the outer brake shoe 151 may be predetermined. When the operator releases the pressure on the brakes the spring 194 or 197, depending upon which has been compressed, will return to its normally extended condition, thus returning the outer brake shoe 151 to its original angular position with respect to anchor member 144.

The brake actuating means are so designed that equalized braking action of the inner and outer brake shoes is assured, and as embodied comprise the brake cylinders 210 firmly bolted to the frame 177 which in turn is attached by means of bolts 211 to the anchor member 144. As fluid under pressure is supplied through the pipe 213 to the cylinder, the piston 214 which is loosely fitted within the cylinder will be forced to the left (Fig. 7) thus driving pin 215 before it in the same direction. The outer end of pin 215 is seated in a concave depression 216 which is provided in the web like structure 180 of the outer brake shoe 151, so that the outer brake shoe will be forced into braking contact with drum 132. At the same time an exactly equal and opposite pressure is exerted upon the anchor member 144 and through it to the inner brake shoe 157 and upon the plate 140. The brake shoes 151, 157 are normally restrained from contact with the drum 132 and the plate 140 by the action of coiled springs 220, which are attached at their ends to pegs 221 projecting inwardly from the inner peripheries of the shoes.

The invention in its broader aspects is not limited to the specific mechanisms shown and described but departures may be made therefrom within the scope of the accompanying claims without departing from the principles of the invention and without sacrificing its chief advantages.

What I claim is:

1. In a vehicle brake, the combination of a pair of interconnected parallel annular discs connected to the member to be braked, an anchor member between said discs mounted for axial, but not angular, movement with respect to said discs, a shoe connected to one side of the anchor member, a second shoe mounted on the other side of said member for angular and axial movement with respect thereto, means between the anchor member and the second shoe for moving them axially apart, and means likewise therebetween for imparting such movement when the second shoe is rotated angularly with respect to said anchor member.

2. In a vehicle brake, the combination of a pair of interconnected parallel annular discs connected to the member to be braked, an anchor member between said discs mounted for axial, but not angular, movement with respect to said discs, a shoe connected to one side of the anchor member, a second shoe mounted on the other side of said member for angular and axial movement with respect thereto, and means interconnecting the anchor member and the second shoe for moving them axially apart when the second shoe is rotated angularly with respect to said anchor member.

3. In a vehicle brake, the combination of a pair of interconnected parallel annular discs connected to the member to be braked, an anchor member between said discs mounted for axial, but not angular, movement with respect to said discs, a shoe connected to one side of the anchor member, a second shoe mounted on the other side of said member for angular and axial movement with respect thereto, said anchor member and said second shoe having oppositely disposed arcuately concave portions on their facing sides, and a spheroidal ball between said arcuately concave portions whereby said anchor member and said second shoe are forced axially apart upon relative angular rotation in either direction of the two members.

4. In a vehicle brake, the combination of a pair of interconnected parallel annular discs connected to the member to be braked, an anchor member between said discs mounted for axial, but not angular, movement with respect to said discs, a shoe connected to one side of said anchor member, a second shoe mounted on the other side of said member for angular and axial movement with respect thereto, means between the anchor member and the second shoe for forcing them axially apart when the second shoe is rotated angularly with respect to said anchor member, and means connecting said member and said shoe for variably resiliently limiting the angular rotation of said shoe.

5. In a vehicle brake, the combination of a pair of interconnected parallel annular discs connected to the member to be braked, an anchor member between said discs mounted for axial, but not angular, movement with respect thereto, a shoe connected to one side of said anchor member for frictional engagement with one of said annular discs, a second shoe mounted on the other side of said anchor member for angular and axial movement with respect thereto and for frictional engagement with the other of said annular discs, and means between said anchor member and said second shoe for forcing said members axially apart as said second shoe has frictional contact and is rotated with its annular disc.

6. In a vehicle brake, the combination of a pair of interconnected parallel annular discs connected to the member to be braked, an anchor member between said discs mounted for axial, but not angular, movement with respect thereto, an annular brake shoe between said member and one of said annular discs, a wedge shaped projection on the face of the anchor member toward the brake shoe, a second wedge shaped projection on the side of the brake shoe toward the anchor member, said wedge shaped projections having their inclined faces abutting, and means connecting said anchor member and said brake shoe whereby the angular relationship between said members may be varied and fixed.

7. In a vehicle brake, the combination of a pair of interconnected parallel annular discs connected to the member to be braked, an anchor member between said discs mounted for axial, but not angular, movement with respect thereto, an annular brake shoe mounted on one side of said member for variable axial spacement with respect thereto, a second annular brake shoe mounted on the other side of said member for angular and axial movement with respect thereto, and means between the anchor member and the second brake shoe for forcing them axially apart when the second shoe is rotated angularly with respect to said anchor member.

8. In a vehicle brake, the combination of a pair of interconnected parallel annular brake discs connected to a member to be braked, an anchor member between said discs mounted for axial, but not angular, movement with respect to said discs, a shoe at one side of the anchor member and secured thereto by means permitting variable axial spacing of the shoe and anchor member, a second shoe mounted on the other side of said anchor member and means operable between the shoes and under control of an operator for axially moving the second shoe relatively to the anchor member.

9. In a vehicle brake, the combination of a pair of interconnected parallel annular brake discs connected to a member to be braked, an anchor member between said discs mounted for axial, but not angular, movement with respect to said discs, a shoe at one side of the anchor member and secured thereto by means permitting variable axial spacing of the shoe and anchor member, a second shoe mounted on the other side of said anchor member and means operable between the shoes and under control of an operator for axially moving the second shoe relatively to the anchor member, said first shoe and anchor member having interengaging wedge surfaces for axial spacing of the first shoe and anchor member by relative angular movement and means for holding them against such angular movement.

10. In a vehicle brake, the combination of a pair of interconnected parallel annular brake discs connected to a member to be braked, an anchor member between said discs mounted for axial, but not angular, movement with respect to said discs, a shoe at one side of the anchor member and secured thereto by means permitting variable axial spacing of the shoe and anchor member, a second shoe mounted on the other side of said anchor member and means operable between the shoes and under control of an operator for axially moving the second shoe relatively to the anchor member and wedge surfaces between the second shoe and anchor member whereby relative angular movement axially moves the second shoe relatively to the anchor member.

11. In a vehicle brake, the combination of a pair of parallel annular brake shoes, means for holding one of the brake shoes against angular movement, a plurality of spherical balls, a plurality of arcuately concave faced wedge members carried by one shoe adjacent to the other shoe and cooperating with the balls supported by the other shoe in fixed axial relation thereto whereby relative angular movement of the shoes causes axial movement of the shoes.

CHARLES S. ASH.